United States Patent Office 3,558,596
Patented Jan. 26, 1971

3,558,596
FIRE-RESISTANT CELLULOSIC MATERIALS AND A METHOD OF PREPARATION
Donald N. Demott, Midland, Mich., assignor to The Dow Chemical Company, Midland, Mich., a corporation of Delaware
No Drawing. Filed July 22, 1969, Ser. No. 843,823
Int. Cl. C08b *3/22, 27/58*
U.S. Cl. 260—218                                  10 Claims

ABSTRACT OF THE DISCLOSURE

Fire-resistant, cross-linked cellulosic materials are prepared by reacting a cellulosic material with a vinylphosphonate having the structural formula:

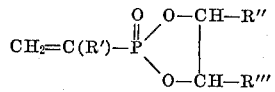

wherein R', R" and R''' are hydrogen or hydrocarbon groups. Said fire-resistant materials are useful in the textile, wood and paper industries.

BACKGROUND OF THE INVENTION

Compounds containing phosphorus and/or a halogen have been chemically included in many synthetic polymer systems to make them fire-resistant. However, such phosphorus- and/or halogen-containing compounds have enjoyed only limited use in making fire-resistant cellulosic materials because of the corrosive by-products, such as HBr, produced in their reaction with cellulose which discolor and degrade the cellulose.

SUMMARY OF THE INVENTION

It has now been discovered that novel fire-resistant, cross-linked cellulosic materials are prepared in the novel process which comprises reacting by contacting a cellulosic with a vinylphosphonate having the structural formula:

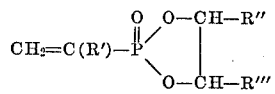

wherein R', R" and R''' are hydrogen or hydrocarbon groups. The fire-resistant materials are useful in the textile, wood and paper industries, and are particularly useful in the textile industry.

In the novel process, the vinylphosphonates are unique compounds having several advantages over compounds previously used to cure or impart fire-resistance to cellulosic materials. The major advantage is that the product is not contaminated with corrosive or toxic reaction by-products since the vinylphosphonates react with cellulose first in an addition reaction with the cellulosic hydroxyl groups through its cyclic ethylene group and secondly in another addition reaction with other vinylphosphonate molecules through the vinyl groups to give the cross-linked cellulosic product.

Suitable vinylphosphonates in the subject process have the structural formula:

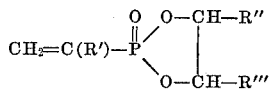

wherein R', R" and R''' are hydrogen or hydrocarbon groups of 1 to about 6 carbon atoms. Preferably R' is hydrogen; and most preferably, R' is hydrogen and R" and R''' are hydrogen or methyl. The vinylphosphonates are conveniently prepared by using the appropriate reactants in the method rescribed by A. N. Pudovik et al., Zh. Obshch. Khim. 36(2), 310(1966) (Chemical Abstracts 64:15916b), or by any one of the other known methods of preparing cyclic esters of vinylphosphonic acid.

By the term cellulosic, we mean to include cellulose as used in the textile industry in the form of a fiber, yarn or fabric, such as fibers, yarns and fabrics of cotton, hemp, flax and viscose rayon, and as used in the wood industry in the form of a bulk solid, such as wood and wood products or wood chips, and as used in the paper industry in the form of a pressed solid, such as paper from wood pulp or other sources of cellulose.

The invention is of particular use in the textile industry in that the vinylphosphonate additionally imparts permanent-press as well as fire-resistance to cellulosic fabrics and to fabric blends of cellulosic fibers and fibers of wool, polyester, rayon, nylon, or other like synthetic fibers. Such fabric blends are well known and widely used in the art.

The vinylphosphonates may be suitably brought into contact with the cellulosic reactant in any convenient method. In practice, the cellulosic is generally (1) dipped into a bath, or (2) sprayed with the vinylphosphonate or a solution of vinylphosphonate comprising said vinylphosphonate and an inert carrier. In most applications, a solution is preferred. Suitable inert carriers include acetone, methylene chloride, methylchloroform and other like halogenated hydrocarbons. Other typical additives, such as antimicrobials, antifungals, preservatives, and the like, may also be included in the solution so long as such additives are substantially inert to the vinylphosphonate.

Suitable reaction temperatures are selected between about 25° C. and the decomposition temperatures of the vinylphosphonate or the particular cellulosic. A reaction temperature between 100 and about 225° C. is preferred. The reactants should be maintained in contact one with the other at the selected reaction temperature until the desired cross-linked product is obtained.

Pressure on the reaction is not critical and subatmospheric, atmospheric or superatmospheric pressure may be used. Atmospheric pressure is convenient and therefore preferred.

A cross-linking amount of the vinylphasphonate, or a mixture of vinylphosphonates, is used in the subject process. Typically, this includes amounts of vinylphosphonate up to about 20 weight percent, based on the weight of the cellulosic, and higher if highly fire-resistant and/or highly cross-linked materials are desired. At concentrations of above about 20 weight percent, however, the products may tend to discolor.

The subject reaction may advantageously include a catalytic amount of a free-radical type catalyst. Suitable catalysts are selected from the known class of compounds which are capable of readily providing free-radicals under process conditions. Generally, such compounds are peroxides, such as cumene peroxide, benzoyl peroxide, t-butyl peroxide, and other similar known peroxides.

SPECIFIC EMBODIMENTS

The following examples further illustrate the invention.

Example 1

Cotton fabric—Fire resistant.—Cotton fabric, i.e., a 4-inch square of 100% 80 x 80 untreated print cloth, was leached in refluxing acetone for one hour and then dried at 110° C. for one hour. The leached fabric was immersed in a solution consisting of cyclic ethylene vinylphosphonate, hereinafter EVP (10 g.), benzoyl peroxide (2 g.) and acetone (188 g.) at room temperature. It was dried in air for 20 minutes at room temperature and then for one hour at 110° C., and analyzed for phosphorus content. It contained 3% phosphorus by weight, based on the original weight of the acetone-leached sample. One-half of this treated fabric was leached in refluxing acetone for one hour and then dried for one hour at 110° C. This sample contained 2% phosphorus by weight, based on one-half of the original weight of the acetone-leached sample. The EVP-treated sample was found to burn much slower when held in a direct flame than did the untreated control sample, and, the treated sample differed from the control in that the treated sample had no afterglow when the flame was extinguished.

Example 2

Cotton fabric—Permanent press.—A cotton fabric was reacted with EVP as in Example 1 except that it was clamped into a tight crease during the curing step. The sample retained its crease even after it was (1) soaked with water, or (2) held flat for a week under a heavy weight.

Similar permanent-press characteristics are obtained using a fabric blend of cotton and wool, polyester, rayon or nylon.

Example 3

Reaction of cotton fabric with EVP—No peroxide catalyst.—A cotton fabric was reacted with EVP as in Example 1 above, except that no benzoyl peroxide was used. The treated sample contained 2.76 percent phosphorus by weight, based on the original weight of the acetone leached sample. The treated sample was leached with acetone, as per Example 1, and was found to contain 0.7 percent phosphorus. This fabric had similar fire-resistant properties as did the EVP treated fabric in Example 1.

Example 4

Wood—Fire resistant.—A wood sample treated in the same manner as the cotton fabric in Example 1, i.e., leached with acetone, reacted with EVP and cured one hour at 110° C., is fire-resistant.

Similar fire-resistant properties are imparted to cotton, wood and paper when reacted with EVP or other vinylphosphonates as described above.

I claim:
1. A curable cellulosic composition comprising (a) a cellulosic material, and (b) a vinylphosphonate having the structural formula:

$$CH_2=C(R')-P\begin{matrix}O\\\parallel\end{matrix}\diagup\begin{matrix}O-CH-R''\\ \big| \\ O-CH-R'''\end{matrix}$$

wherein R' is hydrogen and R'' and R''' are hydrogen or methyl.

2. A process for producing a fire-resistant, cross-linked cellulosic composition comprising reacting by contacting (a) a cellulosic material with (b) a vinylphosphonate having the structural formula:

$$CH_2=C(R')-P\begin{matrix}O\\\parallel\end{matrix}\diagup\begin{matrix}O-CH-R''\\ \big| \\ O-CH-R'''\end{matrix}$$

wherein R' is hydrogen and R'' and R''' are hydrogen or methyl.

3. The process defined in claim 2 wherein the reaction temperature is between about 100° C. and about 225° C.

4. The process defined in claim 2 wherein said process is conducted in the presence of a catalytic amount of a free-radical catalyst.

5. A fire-resistant, cross-linked cellulosic composition produced by the process defined in claim 2.

6. The composition defined in claim 5 wherein (a) comprises a cellulose fiber.

7. The composition defined in claim 6 wherein said fiber is cotton, hemp, flax or viscose rayon.

8. The composition defined in claim 7 wherein said fiber is in the form of a fabric or yarn.

9. The composition defined in claim 8 wherein said fabric or yarn is a blend of said cellulosic fibers and fibers of wool, polyester, rayon or nylon.

10. The composition defined in claim 5 wherein (a) is wood, wood pulp or paper.

References Cited

UNITED STATES PATENTS 2,510,699   6/1950   Ladd et al. _____ 260—219

OTHER REFERENCES

Chemical Abstracts, vol. 64, No. 11, May 23, 1966, p. 15,916b.

Chemical Abstracts, vol. 68, No. 7, Feb. 12, 1968, p. 2835.

DONALD E. CZAJA, Primary Examiner

R. W. GRIFFIN, Assistant Examiner

U.S. Cl. X.R.

8—116; 117—136; 260—219